United States Patent
Masatsugu et al.

(10) Patent No.: US 10,421,220 B2
(45) Date of Patent: Sep. 24, 2019

(54) FOAMED RESIN MOLDED ARTICLE

(71) Applicant: TOYODA GOSEI CO., LTD., Kiyosu-shi, Aichi-ken (JP)

(72) Inventors: Yoshinori Masatsugu, Kiyosu (JP); Hitoshi Fujisawa, Kiyosu (JP); Shuji Inui, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 55 days.

(21) Appl. No.: 15/832,957

(22) Filed: Dec. 6, 2017

(65) Prior Publication Data
US 2018/0272576 A1 Sep. 27, 2018

(30) Foreign Application Priority Data
Mar. 27, 2017 (JP) ................................ 2017-061982

(51) Int. Cl.
*B29C 44/02* (2006.01)
*B29C 44/42* (2006.01)
(Continued)

(52) U.S. Cl.
CPC .............. *B29C 44/02* (2013.01); *B29C 44/42* (2013.01); *B29C 44/586* (2013.01); *B29K 2023/06* (2013.01); *B29K 2023/12* (2013.01); *B29K 2025/06* (2013.01); *B29K 2027/06* (2013.01); *B29K 2055/02* (2013.01);
(Continued)

(58) Field of Classification Search
CPC ....... B29C 44/02; B29C 44/586; B29C 44/42; B29K 2995/0097; B29K 2077/00; B29K 2069/00; B29K 2067/006; B29K 2067/003; B29K 2055/02; B29K 2027/06; B29K 2025/06; B29K 2023/06; B29K 2105/043; B29K 2023/12; B29L 2031/3008; Y10T 428/26
See application file for complete search history.

(56) References Cited

U.S. PATENT DOCUMENTS
6,701,548 B2 * 3/2004 Vigneron ............. A47C 19/202
5/110

FOREIGN PATENT DOCUMENTS
JP 2002-225058 A 8/2002
JP 2012-200979 A 10/2012
(Continued)

OTHER PUBLICATIONS

[NPL-1] Miyase (JP 2012-200979 A); Oct. 2012 (JPP—machine translation to English). (Year: 2012).*

*Primary Examiner* — David Sample
*Assistant Examiner* — Donald M Flores, Jr.
(74) *Attorney, Agent, or Firm* — Posz Law Group, PLC (57) ABSTRACT

A foamed resin molded article having an integral section formed as a dense resin section, which has suppressed resin foaming. The mounting section has improved mounting strength. The foamed resin molded article has a base body and a mounting section, which is formed integrally with the base body and protrudes from the base body. The mounting section has a body section, which has a mounting hole allowing a counterpart member to be inserted therein, and a leg section, which has one end thereof continuous with the body section and the other end thereof continuous with the base body. A thickness of a portion at the base body side of the leg section is smaller than a thickness of the body section.

21 Claims, 2 Drawing Sheets

(51) Int. Cl.
*B29C 44/58* (2006.01)
*B29L 31/30* (2006.01)
*B29K 23/00* (2006.01)
*B29K 105/04* (2006.01)
*B29K 25/00* (2006.01)
*B29K 27/06* (2006.01)
*B29K 55/02* (2006.01)
*B29K 67/00* (2006.01)
*B29K 69/00* (2006.01)
*B29K 77/00* (2006.01)

(52) U.S. Cl.
CPC .. *B29K 2067/003* (2013.01); *B29K 2067/006* (2013.01); *B29K 2069/00* (2013.01); *B29K 2077/00* (2013.01); *B29K 2105/043* (2013.01); *B29K 2995/0097* (2013.01); *B29L 2031/3008* (2013.01); *Y10T 428/26* (2015.01)

(56) References Cited

FOREIGN PATENT DOCUMENTS

| | | | |
|---|---|---|---|
| JP | 2012200979 A | * | 10/2012 |
| JP | 2014-121793 A | | 7/2014 |

* cited by examiner

FOAMED RESIN MOLDED ARTICLE

TECHNICAL FIELD

The present invention relates to a foamed resin molded article integrally having a mounting section.

BACKGROUND ART

In recent years, reduction of weights of various apparatuses is desired, and reduction of weights of resin molded articles forming parts of the apparatuses is also desired. One example of a method for reducing the weight of a resin molded article is a method of foaming a resin through a molding method including a core-back step, for example. A molded article made of foamed resin, i.e., a foamed resin molded article, has a large number of pores therein. Thus, such a molded article has a lower density and a smaller weight than a solid resin molded article not containing bubbles.

Meanwhile, there is a resin molded article integrally provided with a mounting section for allowing a separate member to be fixed to the resin molded article by means of a tapping screw or the like, for example. The tapping screw is screwed to the mounting section, thereby being fixed to the resin molded article. The separate member is fixed to the resin molded article through the tapping screw.

A relatively large force acts on the mounting section of this kind, when the mounting section is screwed with the tapping screw. Thus, the mounting section is required to have a certain degree of mounting strength. However, there is problem in that, although the foamed resin molded article mentioned above has a large number of pores and thus is effective for weight reduction, the foamed resin molded article is inferior in mounting strength due to the pores, compared with a solid resin molded article.

As a method for improving the mounting strength of amounting section by suppressing resin foaming in the mounting section while realizing weight reduction by causing sufficient resin foaming in a base body in a foamed resin molded article, there is a technique disclosed in Japanese Laid-Open Patent Publication No. 2002-225058, for example. In Japanese Laid-Open Patent Publication No. 2002-225058, the entirety of the mounting section is made thin, whereby the resin material in the mounting section is hardened by the mold surface before a core-back step, so as to suppress resin foaming. Thus, the entirety of the mounting section is formed as a dense resin section, so as to improve the mounting strength of the mounting section.

However, with the technique disclosed in Japanese Laid-Open Patent Publication No. 2002-225058, the entirety of the mounting section can be made as a dense resin section having suppressed resin foaming, whereas the thickness of the entirety of the mounting section is reduced, and thus, the mounting strength of the portion to be screwed with a tapping screw fails to be sufficiently improved.

The present invention has been made in consideration of the circumstances described above. An object of the present invention is to provide a foamed resin molded article integrally having a mounting section formed as a dense resin section having suppressed resin foaming, the mounting section having sufficiently improved mounting strength.

A foamed resin molded article, of the present invention, solving the problem described above includes: a base body; and a mounting section formed integrally with the base body and protruding from the base body, wherein the mounting section includes: a body section having a mounting hole allowing a counterpart member to be inserted therein; and a leg section having one end thereof continuous with the body section and the other end thereof continuous with the base body, and a thickness of a portion at the base body side of the leg section is smaller than a thickness of the body section.

A foamed resin molded article of the present invention includes: a base body; and a mounting section protruding from the base body. The mounting section includes: a body section having a mounting hole allowing a counterpart member, such as a tapping screw, to be inserted therein; and a leg section located between the body section and the base body. The leg section has one end thereof continuous with the body section and the other end thereof continuous with the base body. The thickness of a portion at the base body side of the leg section continuous with the base body is smaller than the thickness of the body section.

For example, when molding employing a foamed resin molding method including a core-back step is performed, the resin material of the portion at the base body side of the leg section, the portion being made thin, is cooled to be hardened by the mold surface before the core-back step. Since the resin material of the portion at the base body side of the leg section is hardened before the core-back step, internal pressure decrease in the cavity of the portion for molding the body section is suppressed and resin foaming in the cavity is sufficiently suppressed in the core-back step. That is, by making thin the portion at the base body side of the leg section in the mounting section, resin foaming in the body section is suppressed without making thin the body section into which the counterpart member is inserted. Therefore, the body section required to have improved mounting strength becomes a dense resin section having suppressed resin foaming, without making the thickness of the body section small.

Therefore, the foamed resin molded article of the present invention realizes a foamed resin molded article integrally having amounting section formed as a dense resin section having suppressed resin foaming, the mounting section having sufficiently improved mounting strength.

Hereinafter, a preferable embodiment of a foamed resin molded article according to the present invention is described with reference to FIG. 1 to FIG. 4. The accompanying drawings used for description are only schematic, and the shapes, relative positional relationships, size relationships, and the like of parts are not necessarily drawn to scale. Unless otherwise specified, a numerical range "x to y" described herein includes a lower limit x and an upper limit y. The upper limit value and the lower limit value as well as numerical values described in the embodiment are optionally combined to provide new numerical ranges. A numerical value optionally selected from these numerical ranges may be used as the numerical value of the upper or lower limit.

Matters required for carrying out the present invention other than matters specifically mentioned herein are understood to be design matters, for a person skilled in the art, based on conventional art in the relevant field. The present invention is carried out on the basis of the contents described herein and common technical knowledge in the relevant field.

EMBODIMENT

Figure 1:
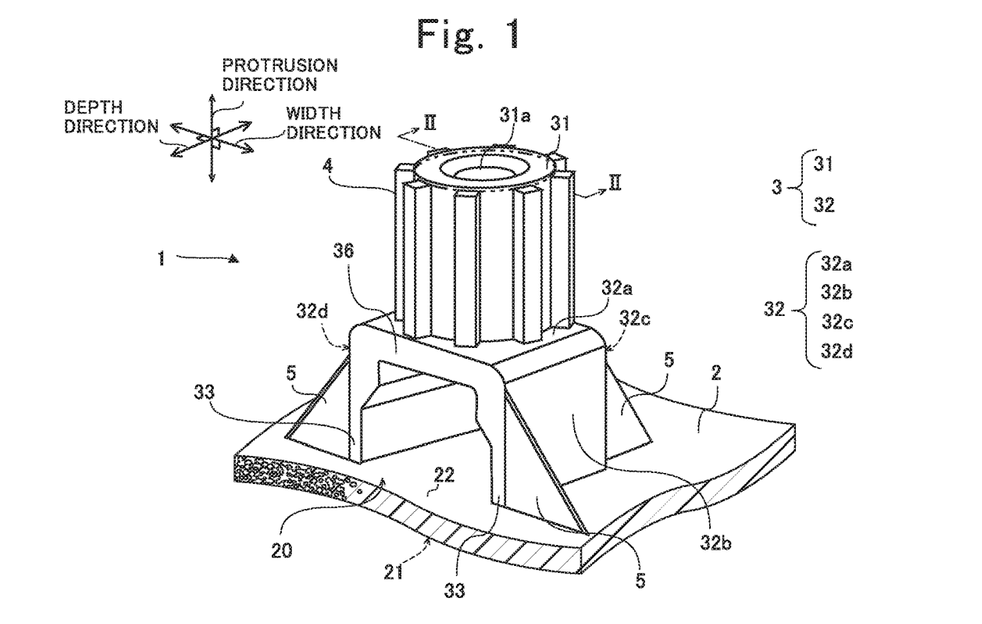
FIG. 1 is a schematic perspective view of a foamed resin molded article according to an embodiment.
Figure 2:
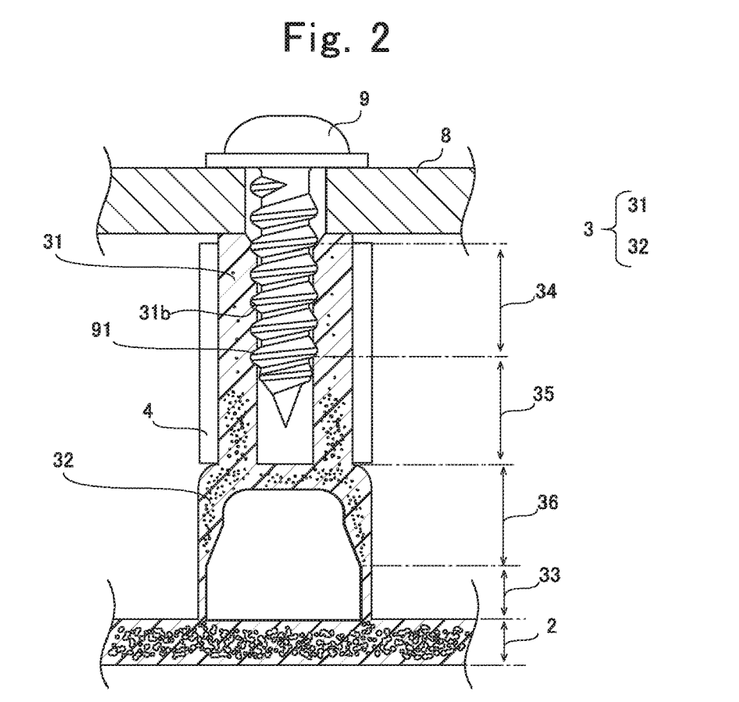
FIG. 2 is a schematic explanatory drawing of the foamed resin molded article according to the embodiment, the foamed resin molded article being screwed with a tapping screw.
Figure 3:
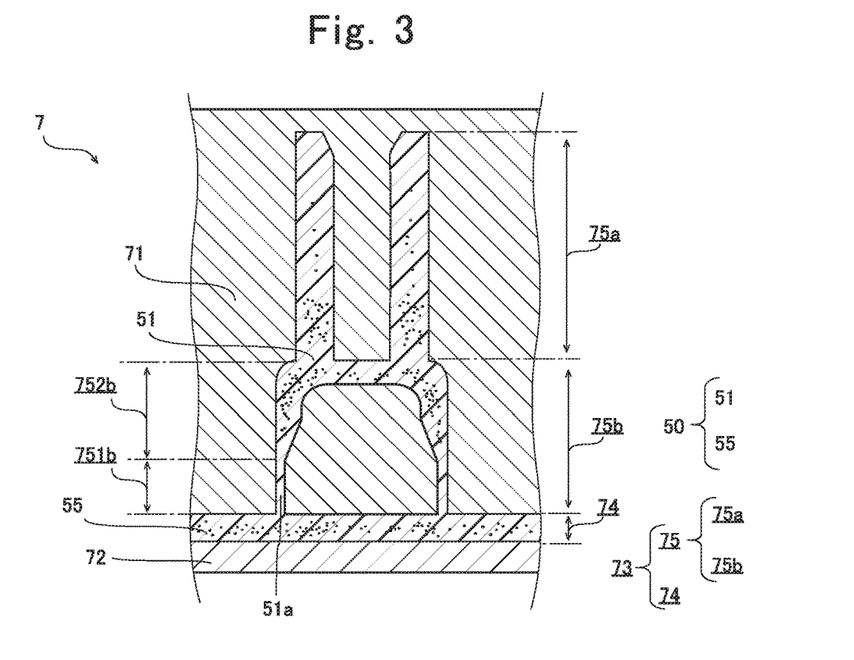
FIG. 3 is a schematic explanatory drawing showing the manner of producing the foamed resin molded article according to the embodiment.
Figure 4:
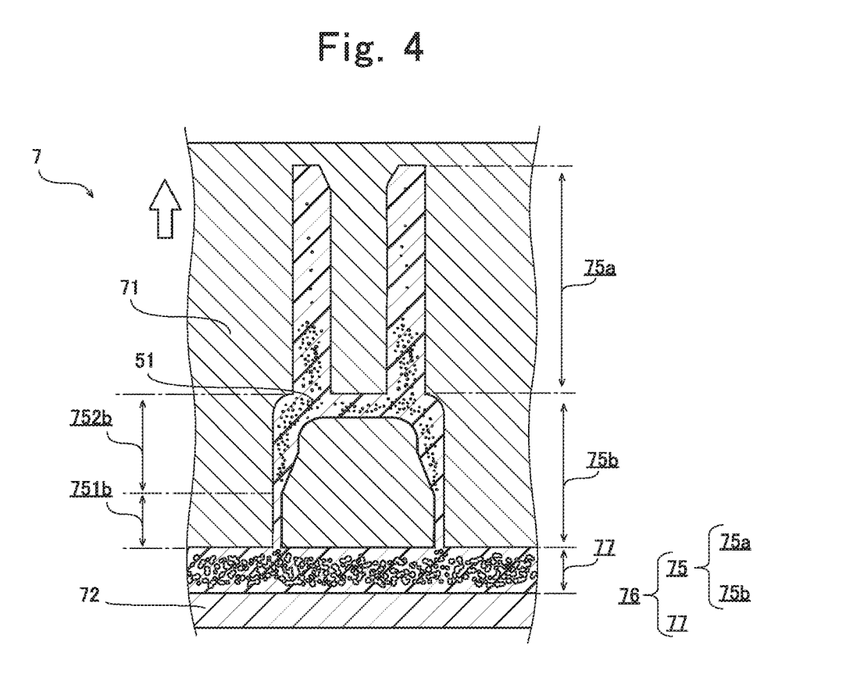
FIG. 4 is a schematic explanatory drawing showing the manner of producing the foamed resin molded article according to the embodiment.

A foamed resin molded article 1 according to the embodiment forms a part of an instrument panel of a vehicle. FIG. 1 is a partial and schematic perspective view of the foamed resin molded article 1 according to the embodiment. FIG. 2 is a cross-sectional view along the II-II line shown in FIG. 1, and a partial and schematic explanatory drawing showing a cross-section of the foamed resin molded article 1 according to the embodiment, the foamed resin molded article being screwed with a tapping screw 9. FIG. 3 and FIG. 4 are each a schematic explanatory drawing showing the manner of producing the foamed resin molded article 1 according to the embodiment. Specifically, FIG. 3 shows a mold 7 and a foamed resin molded article intermediate in an injection step. FIG. 4 shows the mold 7 and a foamed resin molded article intermediate in a core-back step.

The foamed resin molded article 1 according to the embodiment includes a base body 2 and a mounting section 3, and the base body 2 and the mounting section 3 are molded integrally with each other. The base body 2 forms a part of an instrument panel of a vehicle as described above. The base body 2 is provided with a window not shown, and a duct 8 for an air conditioner is mounted to the window. The tapping screw 9 for fixing the duct 8 to the instrument panel, i.e., the foamed resin molded article 1, is screwed to the mounting section 3. Since the duct is a member having a relatively large mass, the mounting section 3 and the tapping screw 9 need to be firmly screwed with each other. Therefore, the mounting section 3 is required to have mounting strength that allows the mounting section 3 to withstand the torque applied when the tapping screw 9 is screwed thereto.

The base body 2 is integrally provided with the mounting section 3 standing therefrom. Specifically, the base body 2 includes a design face 21 facing the compartment, and a rear face 22 facing the opposite side to the design face 21. The mounting section 3 is provided at the rear face 22. In the base body 2, the portion where the mounting section 3 is provided and a peripheral edge section thereof will be referred to as a non-mounting section 20. The non-mounting section 20 has a substantially flat plate shape. The base body 2 may be formed only of the non-mounting section 20 or may include a portion other than the non-mounting section 20, i.e., a portion not flush with the non-mounting section 20, or a portion disposed in a direction crossing the non-mounting section 20.

In the embodiment, the protrusion direction of the mounting section 3 protruding from the rear face 22 of the non-mounting section 20 is a direction substantially perpendicular to the rear face 22 of the non-mounting section 20. The protrusion direction of the mounting section 3 is not limited in particular, and may be a direction in which the mounting section 3 protrudes at a predetermined angle with respect to the rear face 22 of the non-mounting section 20. Herein, unless otherwise specified, "protrusion direction" denotes the protrusion direction of the mounting section 3, the direction being indicated in FIG. 1. The axial direction of a screw-engagement region 34 described later is assumed to be aligned with the protrusion direction of the mounting section 3, and the axial direction of the tapping screw 9 screwed to the mounting section 3 is also assumed to be aligned with the protrusion direction of the mounting section 3. "Width direction" described later denotes a direction orthogonal to the protrusion direction, the direction being indicated in FIG. 1. Further, "depth direction" described later denotes a direction orthogonal to the protrusion direction and orthogonal to the width direction, the direction being indicated in FIG. 1. In the embodiment, the width direction is a direction along which a later-described first side wall 32b and a later-described second side wall 32d are separated from each other. The base body 2 of the embodiment extends in the width direction and in the depth direction.

The mounting section 3 in the embodiment includes a body section 31 and a leg section 32. In the mounting section 3, the body section 31 is located at the distal side, and the leg section 32 is located at the proximal side. The body section 31 and the leg section 32 are integrally continuous with each other, and further, the leg section 32 is integrally continuous with the base body 2.

As shown in FIG. 1 and FIG. 2, the body section 31 has a cylindrical shape, and includes a mounting hole 31a allowing the tapping screw 9 to be inserted and screwed therein. Specifically, the length of the body section 31 in the protrusion direction is desirably not less than 5.0 mm and not greater than 10.0 mm.

The mounting hole 31a in the body section 31 is open at the distal end of the body section 31. As shown in FIG. 2, the mounting hole 31a in the embodiment is a blind hole, and the bottom surface of the mounting hole 31a corresponds to a part of the upper surface of a later-described top wall 32a forming the leg section 32. That is, the mounting hole 31a is defined by the inner surface of the peripheral wall of the body section 31, and a part of the upper surface of the top wall 32a of the leg section 32.

The inner surface of the peripheral wall of the body section 31 defining the mounting hole 31a corresponds to a screw thread 91 of the tapping screw 9 and is provided with a screw-engagement section 31b configured to be screwed with the screw thread 91. In the body section 31, the region from the distal end of the body section 31 to the place where the screw-engagement section 31b is provided is referred to as screw-engagement region 34, and the portion other than the screw-engagement region 34 is referred to as non-screw-engagement region 35.

As shown in FIG. 1, the foamed resin molded article 1 in the embodiment includes eight body rib sections 4 in the body section 31. The body rib sections 4 are molded integrally with the mounting section 3. Specifically, as shown in FIG. 1, each body rib section 4 is integrally provided to the peripheral wall of the body section 31, and is a prism body extending along the protrusion direction. Each body rib section 4 in the embodiment extends along the entirety of the body section 31 in the protrusion direction, but may be provided at least at a portion corresponding to the screw-engagement region 34. Such body rib sections 4 are advantageous in improving the mounting strength in the body section 31.

The leg section 32 is located between the base body 2 and the body section 31, and is formed integrally with the base body 2 and the body section 31. In the embodiment, the cross-sectional shape of the leg section 32 along the protrusion direction is an inverted and substantially U shape.

The sizes of the leg section 32 in the width direction and in the depth direction are greater than the outer diameter of the body section 31. In other words, the lengths of the leg section 32 in the width direction and in the depth direction are greater than the lengths of the body section 31 in the width direction and in the depth direction. That is, the mounting section 3 in the embodiment is shaped such that: the leg section 32 serves as a base; and the body section 31 is disposed on the leg section 32 serving as the base. Thus, since the mounting section 3 is shaped such that the leg section 32 serves as the base for the body section 31, the mounting strength and the stability of the body section 31 in the mounting section 3 are advantageously improved.

As shown in FIG. 1, the leg section 32 in the embodiment includes: the top wall 32*a*; the first side wall 32*b* and the second side wall 32*d* facing each other; and a third side wall 32*c*. The third side wall 32*c* crosses the first side wall 32*b*, the second side wall 32*d*, and the top wall 32*a*.

The top wall 32*a* in the embodiment is in a flat plate shape substantially parallel to the base body 2, and is provided integrally with the body section 31. Specifically, the body section 31 is provided at the upper surface on the upper side of the top wall 32*a* in the protrusion direction. The lengths of the top wall 32*a* in the width direction and in the depth direction are greater than the length of the outer diameter of the body section 31.

Each of the first side wall 32*b* and the second side wall 32*d* is a standing wall extending from the non-mounting section 20 of the base body 2 to the top wall 32*a* along the protrusion direction, and extending in the depth direction. The first side wall 32*b* and the second side wall 32*d* are separated from each other in the width direction orthogonal to the protrusion direction and orthogonal to the depth direction, and face each other. In the protrusion direction, one end of each of the first side wall 32*b* and the second side wall 32*d* is integrally continuous with the top wall 32*a*, and the other end of each of the first side wall 32*b* and the second side wall 32*d* is integrally continuous with the non-mounting section 20 of the base body 2.

The third side wall 32*c* in the embodiment is a standing wall extending from the non-mounting section 20 of the base body 2 to the top wall 32*a* along the protrusion direction, and extending in the width direction. That is, the third side wall 32*c* extends in a direction in which the third side wall 32*c* crosses the first side wall 32*b* and the second side wall 32*d*.

As shown in FIG. 1, in the embodiment, the third side wall 32*c* extends so as to be orthogonal to the first side wall 32*b* and to the second side wall 32*d*. In the protrusion direction, one end of the third side wall 32*c* is integrally continuous with the top wall 32*a*, and the other end of the third side wall 32*c* is integrally continuous with the non-mounting section 20 of the base body 2. One end of the third side wall 32*c* in the width direction is integrally continuous with one end of the first side wall 32*b* in the depth direction, and the other end of the third side wall 32*c* in the width direction is integrally continuous with one end of the second side wall 32*d* in the depth direction. Thus, the leg section 32 of the embodiment has a box shape with one side face thereof open, the box shape having a space defined by the non-mounting section 20 of the base body 2, the first side wall 32*b*, the second side wall 32*d*, and the third side wall 32*c*.

As shown in FIG. 1, the leg section 32 includes: a root section 33 at the other end side being the non-mounting section 20 side of the base body 2; and a non-root leg section 36 other than the root section 33. In the leg section 32 of the embodiment, the thickness of the root section 33 is smaller than the thickness of the body section 31 and smaller than the thickness of the non-root leg section 36.

Meanwhile, with respect to a foamed resin molded article, a portion having suppressed resin foaming is known to have higher rigidity than a portion having sufficient resin foaming. Here, "resin foaming" used herein means that bubbles are formed in a resin material as a result of foaming of a foaming agent contained in a resin material, such as generation of gas from the foaming agent, generation of gas through chemical reaction between the foaming agent and a foaming initiator, or increase in the volume of the gas.

Examples of means for suppressing resin foaming include, in a core-back step during molding, inhibiting of increase in a cavity width for a portion in which resin foaming is to be suppressed. Meanwhile, different from such a method of controlling the molding condition, if, in a mold, the cavity width for a portion of which rigidity is to be improved is designed to be small in advance, resin foaming is also effectively suppressed. The reason is as follows: the resin material injected and filled in a portion having a small cavity width in a mold is cooled by the mold surface faster than in the other portion. That is, a skin layer more easily grows in the portion having a small cavity width than in the other portion. That is, with respect to the resin material injected and filled in the portion having a small cavity width, the resin material solidifies before resin foaming occurs, and thus, the resin section in the portion having a small cavity width becomes a denser resin section than in the other portion. Therefore, the portion having a reduced thickness becomes a dense resin section having suppressed resin foaming, and thus, is advantageous in improving the rigidity of the foamed resin molded article.

As described later, for the foamed resin molded article of the embodiment, a core-back injection molding method is used for causing the molding material in the non-mounting section 20 of the base body 2 to undergo resin foaming to a greater extent than the molding material in the mounting section 3. Of the mounting section 3, the root section 33 being a continuous portion to the base body 2 is thinner than the other portion. Thus, in the injection step before the core-back step, the molding material in the root section 33 is cooled and hardened by the mold surface. Then, when the molding material is caused to undergo resin foaming in the core-back step, the internal pressure in the cavity for molding the mounting section 3 becomes difficult to be reduced because the molding material in the root section 33 has been hardened. The reason is that, of the mounting section 3, the root section 33 being the continuous portion to the base body 2 plays such a role as a sealing plug. Accordingly, the resin foaming of the molding material in the mounting section 3 is suppressed, and after the molding, the mounting section 3 becomes a dense resin section. Thus, as a result of making the thickness of the root section 33 small, the body section 31 being a part of the mounting section 3 becomes a dense resin section, and thus, is advantageous in improving the mounting strength of the mounting section 3 in the embodiment. Therefore, the root section 33 is considered to have a function of sufficiently suppressing resin foaming of the molding material in the body section 31 during molding.

The height of the root section 33 in the protrusion direction is preferably 2.0 mm to 5.0 mm, and more preferably 3.0 mm to 4.0 mm. In addition, the height of the root section 33 in the protrusion direction is preferably 10% to 50% of the height of the entirety of the leg section 32, and more preferably 20% to 40%. Since the height of the root section 33 in the protrusion direction is in the above-described range, the rigidity and the stability of the mounting section 3 are sufficiently improved. The thickness of the root section 33 is preferably 0.5 mm to 1.0 mm, and more preferably 0.5 mm to 0.7 mm. Since the thickness of the root section 33 is in the above-described range, the rigidity of the mounting section 3 is effectively improved, and resin foaming in the body section 31 during molding is sufficiently suppressed. Thus, the body section 31 in the mounting section 3 becomes a dense resin section having sufficiently suppressed resin foaming, without making the thickness of the body section 31 small, and thus, is advantageous in improving the mounting strength.

As shown in FIG. 1, the foamed resin molded article 1 of the embodiment includes leg rib sections 5 in the leg section 32. Each leg rib section 5 is molded integrally with the leg section 32 and the base body 2. The leg rib section 5 is provided to each of the first side wall 32b, the second side wall 32d, and the third side wall 32c of the leg section 32. The leg rib sections 5 in the embodiment are provided at the outer peripheral wall of the leg section 32.

Each leg rib section 5 in the embodiment is a thin plate body of a triangular shape, with one side thereof being provided integrally with a corresponding side wall, and another side thereof being provided integrally with the base body 2. As shown in FIG. 1, one leg rib section 5 is provided at an end in the depth direction of each of the first side wall 32b and the second side wall 32d, and one leg rib section 5 is provided at each of both ends in the width direction of the third side wall 32c. The shape, the arrangement place, and the number of the leg rib section 5 at each side wall are not limited in particular.

In the foamed resin molded article 1 of the embodiment, the base body 2, the mounting section 3 including the body section 31 and the leg section 32, the body rib sections 4 provided to the body section 31, and the leg rib sections 5 provided to the leg section 32 are integrally formed through foam molding by use of the same foaming resin material. As shown in FIG. 2, the base body 2 has a lower density than the mounting section 3, the body rib sections 4, and the leg rib sections 5, and is a non-dense resin section. In other words, the base body 2 has a higher porosity, i.e., a higher proportion of the foaming resin material that has foamed, than the mounting section 3, the body rib sections 4, and the leg rib sections 5. Thus, in the foamed resin molded article 1 of the embodiment, the mounting section 3, the body rib sections 4, and the leg rib sections 5 each having relatively high rigidity are provided to the base body 2 having a relatively light weight. Thus, both of weight reduction and improvement of the mounting strength are realized.

In the body section 31 of the mounting section 3, the resin section corresponding to the screw-engagement region 34 has a higher density than the resin section corresponding to the non-screw-engagement region 35, and is a dense resin section. In other words, the resin section corresponding to the screw-engagement region 34 has a lower porosity, i.e., a lower proportion of the foaming resin material that has foamed, than the resin section corresponding to the non-screw-engagement region 35. Thus, the mounting strength in the body section 31 is advantageously improved. Further, in the leg section 32 of the mounting section 3, the root section 33 has a higher density than the body section 31 and the non-root leg section 36 other than the root section 33, and is a dense resin section. In other words, the root section 33 has a lower porosity, i.e., a lower proportion of the foaming resin material that has foamed, than the body section 31 and the non-root leg section 36 other than the root section 33. Thus, the rigidity in the leg section 32 is advantageously improved.

A method for producing the foamed resin molded article 1 according to the embodiment is described below. Hereinafter, the method for producing the foamed resin molded article 1 according to the embodiment is referred to simply as production method of the embodiment as appropriate. The production method of the embodiment is an injection molding method using a foaming mold provided with a movable mold called a slide core, i.e., a so-called core-back injection molding method.

The production method of the embodiment includes a preparation step, an injection step, a pressure holding step, and a core-back step.

(Preparation Step)

In the preparation step, a resin material and a foaming agent are placed in a foamed resin molding machine not shown, and is heated and softened to obtain a molding material 50 in a fluid state. The molding material 50 to be used in the production method of the embodiment contains 75 parts by mass of polypropylene, 5 parts by mass of sodium hydrogen carbonate, and 20 parts by mass of talc. The sodium hydrogen carbonate functions as a foaming agent. Specifically, the sodium hydrogen carbonate is heated and decomposed into sodium carbonate, water, and carbon dioxide. The carbon dioxide may form bubbles in the molding material. The decomposition reaction rate is enhanced in the presence of water, and therefore, the generation of bubbles may continuously proceed in the molding material due to the decomposition reaction described above.

(Injection Step)

In the injection step, the molding material 50 in a fluid state obtained in the preparation step above is injected and filled in the mold 7 shown in FIG. 3 through an injection machine not shown. The mold 7 to be used in the production method of the embodiment includes a first mold 71 and a second mold 72, and has a cavity defined between the first mold 71 and the second mold 72 and a cavity formed in the first mold 71. The first mold 71 is a movable mold, and is movable in a direction away from the second mold 72 in the core-back step. The second mold 72 is a fixed mold, and the mold surface of the second mold 72 forms the design face 21 of the base body 2. In the injection step, the first mold 71 being the movable mold is disposed at a mold clamping position shown in FIG. 3.

In the injection step, a first cavity 73 is formed between the second mold 72 and the first mold 71 at the mold clamping position, and in the first mold 71. As shown in FIG. 3, the first cavity 73 includes: a mounting section region 75 for molding the mounting section 3; a base body region 74 for molding the base body 2; a body rib region (not shown) for molding the body rib sections 4; and a leg rib region (not shown) for molding the leg rib sections 5. The mounting section region 75, the body rib region, and the leg rib region are formed in the first mold 71. The base body region 74 is formed between the second mold 72 and the first mold 71 at the mold clamping position.

The mounting section region 75 includes: a body section region 75a for molding the body section 31; and a leg section region 75b for molding the leg section 32. The leg section region 75b includes: a root section region 751b for molding the root section 33; and a non-root leg section region 752b for molding the non-root leg section 36. The root section region 751b is a portion continuous to the base body region 74, and has a smaller cavity width than the body section region 75a and the leg section region 75b other than the root section region 751b.

In the injection step, the molding material 50 in a fluid state is injected and filled in the first cavity 73. At this time, the first mold 71 being the movable mold is clamped toward the second mold 72 being the fixed mold, by a force sufficient to maintain the size of the first cavity 73 against the fluid pressure caused by the molding material 50. In other words, at this time, the first mold 71 is clamped toward the second mold 72, by a force sufficient to allow the first mold 71 to be at the mold clamping position shown in FIG. 3 against the fluid pressure caused by the molding material 50. At this time, the temperature of the molding material 50 is relatively high, and thus, in the first cavity 73, following the preparation step, the foaming agent contained in the molding material 50 is gradually heated and decomposed and small bubbles are generated.

(Pressure Holding Step)

In the pressure holding step, following the injection step described above, while the mold clamping force in the injection step is maintained, a state where the pressure in the first cavity 73 is held at a predetermined pressure such as 30 to 40 MPa is maintained for about 0.5 to 1 seconds.

(Core-Back Step)

In the core-back step, as shown in FIG. 4, after the pressure holding step described above, the first mold 71 is slightly moved in a mold opening direction indicated by the white arrow in the drawing, to form a second cavity 76. The mold opening direction in the production method of the embodiment is substantially aligned with the protrusion direction of the mounting section 3 and with the thickness direction of the non-dense section 20 of the base body 2.

The volume of the second cavity 76 formed in the core-back step is greater than the volume of the first cavity 73 formed in the injection step and in the pressure holding step. The volume of the mounting section region 75 is the same before and after the core-back step. That is, in the core-back step, the first mold 71 is moved so as to increase the volume of the base body region 74 in the first cavity 73.

Since the volume of the second cavity 76 formed in the mold 7 through the core-back step is greater than the volume of the first cavity 73 therebefore, the pressure in the second cavity 76 becomes lower than in the first cavity 73. Thus, the molding material 50 in the second cavity 76 expands. More specifically, bubbles in the molding material 50 expand and the molding material 50 expands as a whole.

Meanwhile, with respect to the production method of the embodiment, in the injection step and the pressure holding step, a portion, near the mold surface of the mold 7, of the molding material 50 is cooled by the mold surface to be hardened. In particular, a portion having a small cavity width is hardened up to the interior thereof faster than the other portion. The leg section region 75b in the mounting section region 75 of the embodiment includes the root section region 751b having a smaller cavity width than the other portion. That is, of the molding material 50 filled in the mounting section region 75 (referred to as mounting section intermediate molded article 51), the molding material 50 filled in the root section region 751b (referred to as root section intermediate molded article 51a) is hardened up to the interior thereof faster. Thus, bubbles in the root section intermediate molded article 51a are less likely to expand to a great extent.

As a result of formation of the root section intermediate molded article 51a which is hardened up to the interior thereof in the injection step and the pressure holding step, internal pressure decrease in the core-back step is less likely to occur in the mounting section region 75. The reason is that, as a result of hardening of the root section intermediate molded article 51a, the mounting section region 75 is less likely to be influenced by internal pressure decrease due to change in the volume of the base body region 74, 77. Then, in the core-back step, internal pressure decrease in the mounting section region 75 is suppressed, and as a result, bubbles in the mounting section intermediate molded article 51 become less likely to expand to a great extent.

In contrast, bubbles in the molding material 50 filled in the base body region 74 (referred to as base body intermediate molded article 55) expand to be relatively large in the core-back step, and the base body intermediate molded article 55 also expands to be relatively large. That is, the base body intermediate molded article 55 includes relatively large bubbles, and the mounting section intermediate molded article 51 does not include so many large bubbles. In other words, at this time, the density of the mounting section intermediate molded article 51 is greater than the density of the base body intermediate molded article 55.

Thereafter, when the foamed resin intermediate molded article including the mounting section intermediate molded article 51 and the base body intermediate molded article 55 is cooled to be hardened, the foamed resin molded article 1 including the base body 2 having a relatively low density and the mounting section 3 having a relatively high density is obtained. In other words, the mounting section 3 becomes a dense resin section, and the base body 2 becomes a non-dense resin section. Thus, according to the production method of the embodiment, weight reduction is realized by the base body 2 formed as a non-dense resin section, and the foamed resin molded article 1 having excellent rigidity and having improved mounting strength by the mounting section 3 formed as a dense resin section is obtained.

As described above, since the leg section 32 of the embodiment includes the root section 33 formed as a dense resin section, integration of the base body 2 and the mounting section 3 is enhanced. Further, since the resin section of the body section 31 becomes dense due to the root section 33, the mounting strength of the mounting section 3 is advantageously improved.

The leg section 32 of the embodiment includes the first side wall 32b, the second side wall 32d, and the third side wall 32c in the width direction and the depth direction. Thus, the mounting section 3 of the embodiment is effective in improving the rigidity against external forces from the width direction and the depth direction. Further, the leg section 32 of the embodiment includes the leg rib sections 5. Accordingly, the rigidity is more effectively improved against external forces from the width direction and the depth direction.

In the production method of the embodiment, polypropylene is used as the resin material in the molding material 50, and sodium hydrogen carbonate is used as the foaming agent. However, the combination of the resin material and the foaming agent in the molding material 50 is not limited thereto. Preferably, the resin material is a thermoplastic resin. Examples of the thermoplastic resin other than polypropylene include: polyethylene, polystyrene, polyvinyl acetate, acrylonitrile-butadiene-styrene copolymer resin, (so-called ABS resin), acrylonitrile-styrene copolymer resin (so-called AS resin), acrylic resin, polyamide, polyacetal, polycarbonate, modified polyphenylene ether, polyethylene terephthalate, polybutylene terephthalate, and cyclic polyolefin. Further, fiber-reinforced plastics (so-called FRP) obtained by adding a fiber material to such a resin material as described above may be used.

Also, the foaming agent is not limited in particular, and depending on a resin material to be used, a foaming agent having suitable foaming ability and suitable foaming temperature may be selected as appropriate. For example, as the foaming agent, a general foaming agent which generates gas by being heated and decomposed may be used. Alternatively, a foaming agent of which volume increases due to heat may be used.

Examples of the general foaming agent include: inorganic compounds such as sodium hydrogen carbonate, ammonium hydrogen carbonate, and ammonium carbonate; azo compounds such as azodicarbonamide, 2,2'-azobis9isobutyronitrile, azohexahydrobenzonitrile, and diazoaminobenzene; sulfonyl hydrazide compounds such as benzene sulfonyl hydrazide, benzene-1,3-sulfonyl hydrazide, diphenyl sulfone-3,3'-disulfonyl hydrazide, diphenyl oxide-4,4'-disulfonyl hydrazide, 4,4'-oxybis9(benzene sulfonyl hydrazide), and p-toluenesulfonyl hydrazide; nitroso compounds such as N,N'-dinitrosopentamethylenetetramine, N,N'-dinitroso-N, and N'-dimethylphthalamide; and azide compounds such as terephthalazide and p-t-butylbenzazide.

An example of the foaming agent of which volume increases due to heat is an encapsulated foaming agent. The encapsulated foaming agent means a foaming agent encapsulated in a shell formed from a thermoplastic resin. As the thermoplastic resin forming the shell, a copolymer such as vinylidene chloride, acrylonitrile, an acrylic ester, or a methacrylic acid ester is used. As the foaming agent, a volatile organic solvent such as isobutane, pentane, petroleum ether, hexane, heptane, a low-boiling halogenated hydrocarbon, or methylsilane is used. The volatile organic solvent is also referred to as expanding agent.

In each case, bubbles are formed in the molding material 50 as a result of foaming of the foaming agent, such as, for example, generation of gas from the foaming agent, generation of gas through chemical reaction between the foaming agent and the foaming initiator, or increase in the volume of the gas. Then, as a result of expansion or growing of bubbles in the core-back step, the foamed resin molded article of the present invention is obtained.

A preferable embodiment of the present invention has been described. However, the present invention is not limited to the embodiment described above. The advantageous effects of the present invention are obtained also in the following modification.

For example, as an example of the mounting section 3 in the embodiment, a member configured to have the tapping screw 9 fixed thereto has been described. However, the mounting section is not limited thereto. The mounting section 3 may be used as a projection, such as a clip base, provided for the purpose of mounting, such as fitting, of another component.

The mounting section may have a so-called bell-bottomed shape expanding from the body section toward the leg section, or a shape tapered from the leg section toward the body section. The mounting section may have uniform sizes in the width direction and the depth direction from the body section to the leg section. In either case, the thickness of the root section, of the leg section, being a continuous portion to the base body is configured to be smaller than the thickness of the body section. Preferably, the thickness of the root section is smaller than the thickness of the other portion. Specifically, the other portion here means: the body section; the portion other than the root section of the leg section; and the base body. The thicknesses of the body rib section and the leg rib section are not limited in particular. Moreover, the thickness of the body section and the thickness of the leg section (especially, the first side wall 32*b* and the second side wall 32*d*) respectively may mean the thicknesses of the portions thereof in the width direction shown in FIG. 1. The thickness of the base body may mean the thickness of the base body in the protrusion direction shown in FIG. 1.

The body section 31 of the embodiment may have any tubular shape provided with a hollow mounting hole 31*a*, and may have a shape such as an angled tubular shape other than a cylindrical shape. Although the body section 31 of the embodiment is in the form of a blind hole in which a part of the upper surface of the top wall 32*a* of the leg section 32 serves as the bottom surface of the blind hole, the body section 31 of the embodiment may be, instead, in the form of a through-hole reaching the rear face 22 of the base body 2. That is, the body section 31 of the embodiment may have a through-hole in the top wall 32*a*. If the mounting hole 31*a* of the body section 31 is a blind hole, such a mounting hole 31*a* is advantageous in improving rigidity of the mounting section 3. If the mounting hole 31*a* is a through-hole, such a mounting hole 31*a* is advantageous in moldability.

The leg section 32 of the embodiment has: two standing walls (the first side wall 32*b* and the second side wall 32*d*) in the width direction; and one standing wall (the third side wall 32*c*) in the depth direction. However, the leg section 32 of the embodiment may additionally have a standing wall (fourth side wall) separated from the third side wall 32*c* in the depth direction.

The body rib sections 4 and/or the leg rib sections 5 of the embodiment may be omitted.

The foamed resin molded article of the present invention is expressed as follows.

<1> A foamed resin molded article 1 including:
a base body 2; and
a mounting section 3 formed integrally with the base body 2 and protruding from the base body 2, wherein
the mounting section 3 includes:
a body section 31 having a mounting hole 31*a* allowing a counterpart member 9 to be inserted therein; and
a leg section 32 having one end thereof continuous with the body section 31 and an other end thereof continuous with the base body 2, and
a thickness of a portion 33 at the base body side of the leg section 32 is smaller than a thickness of the body section 31.

<2> The foamed resin molded article 1 according to <1>, wherein
a cross-sectional shape of the leg section 32 along a protrusion direction of the mounting section 3 is an inverted U shape.

<3> The foamed resin molded article 1 according to <2>, wherein
in each of a width direction and a depth direction which are orthogonal to the protrusion direction of the mounting section 3, a length of the leg section 32 is greater than a length of the body section 31.

<4> The foamed resin molded article 1 according to <2> or <3>, wherein
the leg section 32 includes:
a plurality of side walls 32*b*, 32*c*, 32*d* each standing from the base body 2;
a top wall 32*a* connected to the side walls 32*b*, 32*c*, 32*d* and connected to the body section 31; and
a leg rib section 5 connected to the side wall 32*b*, 32*c* or 32*d* and the base body 2.

<5> The foamed resin molded article 1 according to any one of <1> to <4>, wherein
the thickness of the portion 33 at the base body side of the leg section 32 is not less than 0.5 mm and less than 1.0 mm.

<6> The foamed resin molded article 1 according to any one of <1> to <5>, wherein
the body section 31 has a tubular shape.

<7> The foamed resin molded article 1 according to any one of <1> to <6>, wherein
the body section 31 includes a plurality of body rib sections 4 separated from each other in a circumferential direction of the mounting section 3, and extending in a protrusion direction of the mounting section 3.

The invention claimed is:

1. A foamed resin molded article comprising:
    a base body; and
    a mounting section formed integrally with the base body and protruding from the base body, wherein
    the mounting section includes:
        a body section having a mounting hole allowing a counterpart member to be inserted therein; and
        a leg section having one end thereof continuous with the body section and the other end thereof continuous with the base body,
    a thickness of a portion at the base body side of the leg section is smaller than a thickness of the body section, and
    a cross-sectional shape of the leg section along a protrusion direction of the mounting section is an inverted U shape,
    the leg section includes a top wall, and
    the mounting hole is a blind hole.

2. The foamed resin molded article according to claim 1, wherein in each of a width direction and a depth direction, which are orthogonal to the protrusion direction of the mounting section, a length of the leg section is greater than a length of the body section.

3. The foamed resin molded article according to claim 1, wherein the leg section includes a plurality of side walls, which stand from the base body, and a leg rib section, which is connected to the side wall and the base body, wherein the top wall is connected to the side walls and the body section.

4. The foamed resin molded article according to claim 1, wherein the thickness of the portion at the base body side of the leg section is not less than 0.5 mm and less than 1.0 mm.

5. The foamed resin molded article according to claim 1, wherein the body section has a tubular shape.

6. The foamed resin molded article according to claim 1, wherein the body section includes a plurality of body rib sections separated from each other in a circumferential direction of the mounting section and extending in the protrusion direction of the mounting section.

7. The foamed resin molded article according to claim 1, wherein a porosity of a portion of the leg section that is adjacent to the base body is less than that of a portion of the leg section that is adjacent to the body section.

8. A foamed resin molded article comprising:
    a base body; and
    a mounting section formed integrally with the base body and protruding from the base body, wherein
    the mounting section includes:
    a body section having a mounting hole allowing a counterpart member to be inserted therein; and
    a leg section having one end thereof continuous with the body section and the other end thereof continuous with the base body,
    a thickness of a portion at the base body side of the leg section is smaller than a thickness of the body section, and
    a cross-sectional shape of the leg section along a protrusion direction of the mounting section is an inverted U shape,
    the leg section includes a top wall, and
    the base body forms an instrument panel.

9. The foamed resin molded article according to claim 8, wherein in each of a width direction and a depth direction, which are orthogonal to the protrusion direction of the mounting section, a length of the leg section is greater than a length of the body section.

10. The foamed resin molded article according to claim 8, wherein the leg section includes a plurality of side walls, which stand from the base body, and a leg rib section, which is connected to the side wall and the base body, wherein the top wall is connected to the side walls and the body section.

11. The foamed resin molded article according to claim 8, wherein the thickness of the portion at the base body side of the leg section is not less than 0.5 mm and less than 1.0 mm.

12. The foamed resin molded article according to claim 8, wherein the body section has a tubular shape.

13. The foamed resin molded article according to claim 8, wherein the body section includes a plurality of body rib sections separated from each other in a circumferential direction of the mounting section and extending in the protrusion direction of the mounting section.

14. The foamed resin molded article according to claim 8, wherein a porosity of a portion of the leg section that is adjacent to the base body is less than that of a portion of the leg section that is adjacent to the body section.

15. A foamed resin molded article comprising:
    a base body; and
    a mounting section formed integrally with the base body and protruding from the base body, wherein
    the mounting section includes:
    a body section having a mounting hole allowing a counterpart member to be inserted therein; and
    a leg section having one end thereof continuous with the body section and the other end thereof continuous with the base body,
    a thickness of a portion at the base body side of the leg section is smaller than a thickness of the body section, and
    the thickness of the portion at the base body side of the leg section is smaller than a thickness of a portion at a body section side of the leg section.

16. The foamed resin molded article according to claim 15, wherein in each of a width direction and a depth direction, which are orthogonal to a protrusion direction of the mounting section, a length of the leg section is greater than a length of the body section.

17. The foamed resin molded article according to claim 15, wherein the leg section includes a plurality of side walls, which stand from the base body, and a leg rib section, which is connected to the side wall and the base body, wherein a top wall is connected to the side walls and the body section.

18. The foamed resin molded article according to claim 15, wherein the thickness of the portion at the base body side of the leg section is not less than 0.5 mm and less than 1.0 mm.

19. The foamed resin molded article according to claim 15, wherein the body section has a tubular shape.

20. The foamed resin molded article according to claim 15, wherein the body section includes a plurality of body rib sections separated from each other in a circumferential direction of the mounting section and extending in a protrusion direction of the mounting section.

21. The foamed resin molded article according to claim 15, wherein a porosity of a portion of the leg section that is adjacent to the base body is less than that of a portion of the leg section that is adjacent to the body section.

* * * * *